United States Patent [19]

Takita et al.

[11] Patent Number: 4,582,026
[45] Date of Patent: Apr. 15, 1986

[54] FEED-FORWARD TYPE AUTOMATIC CONTROL SYSTEM

[75] Inventors: Atsushi Takita, Mito; Akira Sugano; Masayuki Kumazaki, both of Katsuta, all of Japan

[73] Assignees: Hitachi, Ltd.; Hitachi Engineering Co., Ltd., both of Tokyo, Japan

[21] Appl. No.: 719,144

[22] Filed: Apr. 2, 1985

[30] Foreign Application Priority Data

Apr. 2, 1984 [JP] Japan .................................. 59-65472

[51] Int. Cl.$^4$ ......................... F22B 37/42; F22D 5/00
[52] U.S. Cl. ................................. 122/448 R; 60/667; 122/449; 236/14; 364/492
[58] Field of Search ........... 122/448 R, 448 A, 448 B, 122/448 S, 449; 110/185; 364/492, 494; 60/667; 236/14

[56] References Cited

U.S. PATENT DOCUMENTS

| | | | |
|---|---|---|---|
| 3,862,403 | 1/1975 | Kurihara | 122/448 R X |
| 3,942,327 | 3/1976 | Noe | 122/448 R X |
| 4,064,699 | 12/1977 | Martz | 60/667 X |
| 4,403,293 | 9/1983 | Bradt et al. | 364/494 |
| 4,528,918 | 7/1985 | Sato et al. | 110/185 X |

Primary Examiner—Edward G. Favors
Attorney, Agent, or Firm—Antonelli, Terry & Wands

[57] ABSTRACT

Disclosed is an automatic anticipatory control system for controlling, by one common control quantity, a plurality of points of operation that can be changed over individually and arbitrarily between start and stop operations and between an automatic operation mode and a manual operation mode. The system includes a master controller for obtaining a control signal for each of the points of operation that are operating in the automatic operation mode, on the basis of the sum of biases of the points of operation that are operating in the automatic operation mode, the sum of loads to be borne by the points of operation that are operating in the automatic operation mode on the basis of the common control quantity and the number of the points of operation that are operating in the automatic operation mode; a plurality of sub-loop controllers each disposed for each of the points of operation and generating a driving control instruction for each point of operation on the basis of the control signal; and driving means for practically driving the corresponding points of operation on the basis of the driving control instruction of each sub-loop controller.

8 Claims, 7 Drawing Figures

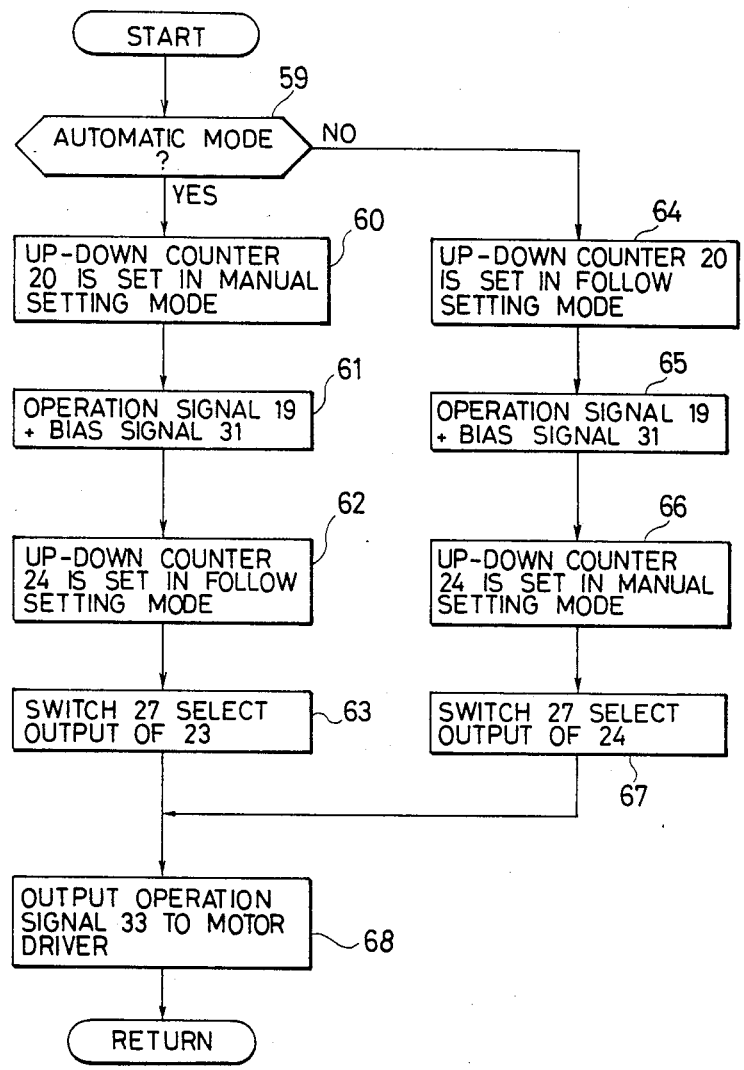

FEED-FORWARD TYPE AUTOMATIC CONTROL SYSTEM

BACKGROUND OF THE INVENTION

1. Field of the Invention

This invention relates generally to an anticipatory control technique, for an automatic control system. More specifically, the present invention relates to an anticipatory control technique for an automatic control system constituted in such a fashion that the output of a master controller operates so as to keep constant the sum of the values of operation parameters of a plurality of operation ends (appliances) equipped individually with sub-loop controllers as individual control devices, and controls the sub-loop controllers by its output.

2. Background of the Invention

An automatic control system equipped with one master controller and a plurality of sub-loop controllers, operating so as to keep constant the sum of the values of the operation parameters is applied, for example, to the following plants.

I. Combustion control of coal fired boilers in thermal power plants:

A coal fired boiler is equipped with a plurality of sets of fuel feeders, each set consisting of a pulverizer for pulverizing the coal to coal dust and a coal feeder capable of adjusting the coal feed quantity to the pulverizer, and the automatic control system described above controls the coal feed quantity to each coal feeder so that the sum of fuels charged into the boiler (or the pulverizer) is constant.

II. Power generation quantity control of gas turbine power plant:

Since the output of a single gas turbine generator is from 70,000 to 80,000 kw, a plurality of gas turbine generators are combined as one set to constitute the power plant. The fuel feed to each gas turbine is controlled on the basis of an instruction signal for the total power generated by the power plant. Power generation is mostly controlled so as to be constant also for a so-called STAG (Steam Turbine And Gas Turbine) system which further includes an auxiliary boiler using the exhaust gas of the gas turbines as the fuel, and drives a steam turbine generator with the resulting steam.

III. Feed water control to boiler of thermal power plant:

A plurality of feed water pumps are used for the boiler, each being driven by a motor or a steam turbine. In this case, the total feed water quantity must be controlled to a predetermined quantity to correspond with the total fuel quantity or total air quantity to the boiler, and the rotating speed of a pump driving steam turbine, for example, is controlled. The pump driving motor is subjected to speed control if it is a variable speed type and to on-off control if it is not.

The automatic control system for the plants described above includes a proportioning integration component in its master controller, and is mostly equipped further with this proportioning integration function in its sub-loop controllers, too. This results in the problem that response is slow when a load demand signal for the master controller changes. In the plants described above, not all the sets are always subjected to operation control, but a suitable number of sets are controlled in accordance with the magnitude of the load demand signal. When any operation ends are started or stopped so as to control the number of sets, this control is conducted by a manually operated signal provided separately by the output of the master controller. Alternatively, the output of the master controller is added to a bias signal from a computer that is disposed separately, and the sum output is applied to a specific sub-loop controller to control its point of operation and to start or stop the operation at a particular point.

The plant and the automatic control system described above are known from 1975, ISA (Instrument Society of America), IPI 75456 (17-26) "DESIGN OVERVIEW FOR PULVERIZER CONTROL SYSTEM". This reference illustrates a fuel control system for a coal fired boiler in FIG. 1 and its controller, in FIG. 2. This system operates the plant in the manner described above and is not free from the problem described above.

To eliminate problem (or the response delay of the plant), a method which suitably adjusts the proportional gain of a controller and the time constant of an integrator may be employed, but the method is not sufficiently satisfactory. The use of anticipatory control in combination with feedback control is a known ordinary control method, but anticipatory control is not easy to practise because various operations such as number change control, manual operation, bias control, and the like, must be made. As is well known in the art, a signal for anticipatory control can not assume an arbitrary value. To fully utilize the effect of anticipatory control, an ideal value for an anticipatory control signal would be one that minimizes the necessity of correction by feedback control.

SUMMARY OF THE INVENTION

To obviate the problem of the prior system described above, the present invention is directed to provide an automatic anticipatory control system capable of improving transient response and load follow-up characteristics by adding an anticipatory control system to an automatic control system of such a type in which the relation of operation instruction for a plurality of points of operation (appliances) is not determined primarily, that is, the output signal of one controller is divided into a plurality of signals and used as the operation instruction for each operation end.

To accomplish the object described above, the present invention is characterized in that an optimal anticipatory control signal is calculated on the basis of the sum of the loads borne by points of operation that are operating in a manual control mode among a plurality of points of operation, the number of points of operation that are operating in an automatic control mode, operating instructions for all points of operation, feedback and bias for each point of operation, thereby providing the control system with an anticipatory control function as well as a feedback control function.

BRIEF DESCRIPTION OF THE DRAWINGS

FIG. 7 is a flowchart showing in detail a coal feed instruction and output step 45 in the flowchart of FIG. 5.

DESCRIPTION OF THE PREFERRED EMBODIMENTS

Hereinafter, one embodiment of the present invention which deals with a coal fired boiler for a thermal power plant will be described by way of example.

Figure 1:
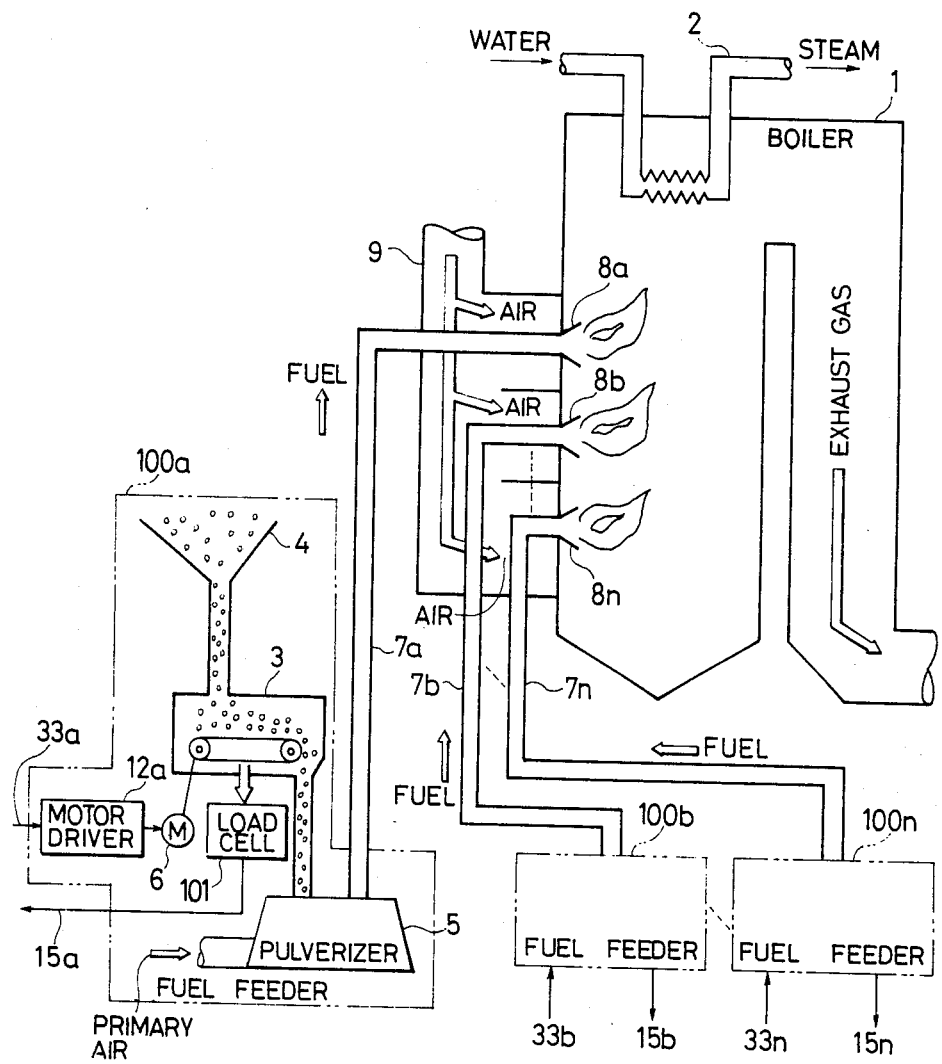
FIG. 1 is a diagram showing a heretofore known coal fired boiler and its fuel feeder.

FIG. 1 illustrates a heretofore known coal-fired boiler described in FIG. 1 of the afore-mentioned paper, and its fuel feeder (coal feeder and pulverizer).

In FIG. 1, reference numeral 1 represents the boiler, and reference numeral 2 represents a heater tube disposed in the boiler. Water is fed by a feed water pump not shown in the drawing. Reference numeral 3 represents a coal feeder, which feeds the coal stored in a coal bunker 4 to a pulverizer 5. The coal feed quantity in this case can be adjusted, for example, by changing the speed of a coal feeder motor 6 with a motor driver 12. The coal dust obtained from the pulverizer 5 is conveyed by the primary air sent from a primary air fan, not shown, through a coal dust pipe 7, and is burnt in coal burners 8a–8n.

Reference numeral 9 represents an air windbox which operates so as to provide combustion secondary air, which is driven by a forced draft fan, not shown, into a coal dust burner 8a. Reference numeral 100 represents a fuel feeder, which is disposed for each coal dust pipe 7. The feed quantity supplied to each pulverizer 5 is sensed, by a load cell 101.

Figure 2:
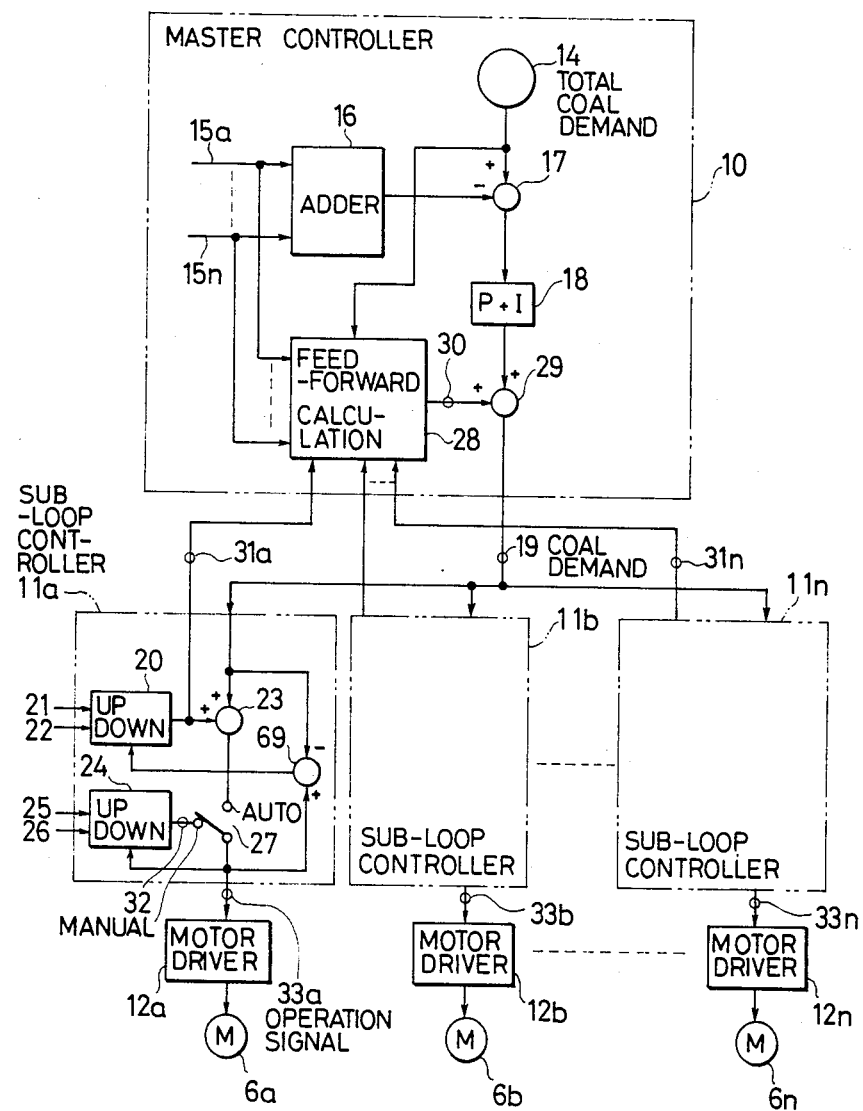
FIG. 2 is a diagram showing the schematic construction of automatic anticipatory control system in accordance with the present invention.

FIG. 2 shows an automatic anticipatory control system in accordance with the present invention. In the drawings, reference numerals 28, 29 and 69 represent those constituents which have been added in the present invention. First of all, the construction of a heretofore known system will be described. In the drawing, reference numeral 10 represents a master controller for calculating the coal demand 19 for each coal feeder 3. Reference numerals 11a–11n represent sub-loop controllers, which generate operation signals for each coal feeder 3 on the basis of the coal demand 19 generated by the master controller 10.

Reference numerals 12a–12n represent motor drivers for the coal feeder motors 6a–6n, respectively. The motor drivers adjust the speed of the coal feeder (belt conveyor) motors 6a–6n in response to the operations signals 33a–33n generated by the corresponding sub-loop controllers 11a–11n.

The detailed construction of the master controller 10 is as follows. Reference numerals 15a–15n represent feedback signals of the coal feed quantity to each coal feeder 3, such as the speed of the coal feeder motor or belt conveyor, the output signal of the load cell (FIGS. 1, 101), or the like. These feedback signals 15a–15n are added by an adder 16, and are compared with an instruction value 14 by a comparator 17. The output of the comparator 17 is applied to a PI calculator 18, where (proportioning +integration) calculation is made and the coal demand 19 for each coal feeder 3 is produced.

Next, the sub-loop controllers 11a–11n will be described in detail. Since all the sub-loop controllers have the same construction and operate in the same way, only one sub-loop controller 11a will be described. Reference numeral 20 represents an up-down counter whose analog output signal 31 is counted up and down in accordance with up-down SW (switch) operation signals 21, 22 from an operator or a separate computer. The output of this up-down counter 20 is added as a bias to the coal demand 19 by the adder 23. In this case, the point of operation 6a is driven by the sum of the signals 19 and 31. This operating condition will be hereinafter called the "bias mode". Reference numeral 24 represents an up-down counter for manual operation, whose analog output 32 is counted up and down in accordance with up-down SW operation signals 25, 26 from the operator. Driving the point of operation 6a by the signal 32 will be hereinafter called the "manual mode".

Reference numeral 27 represents a signal selecting switch, which selects the output 32 of the analog memory 24 in the manual mode and the output of the adder 23 in the auto mode. The selection output of the switch 27 becomes the operation signal for each coal feeder in each of the manual and auto modes. Strictly speaking, the auto mode includes the master mode operated by the signal 19 and the bias mode operated by the sum of the signals 19 and 31.

There is a limit to the minimum coal feed quantity to a pulverizer, as is well known in the art. Therefore, the number of operating coal feeders and pulverizers must be controlled in accordance with the load of the boiler. In other words, the number of operating coal feeders varies with the boiler load. Therefore, the bias signal 31 to the coal feeder is 0 during the automatic operation and is in the master mode. When any of the coal feeders are operated or stopped, the up-down switch of the up-down counter 20 is operated so as to attain the bias mode and to increase or decrease the bias signal 31 as its output. Thus, the coal demand 19 for the coal feeders that are to be operated or stopped is increased or decreased. Depending upon the operating condition of the unit, some coal feeders are often operated in the manual mode by setting the switch 27 to manual. In this case, the coal demand 19 of the master controller 10 acts only upon the other coal feeders which are in the automatic mode.

The conventional feed-forward automatic control system has substantially the construction described above, and the present invention adds the functional elements 28, 29 and 69. Reference numeral 28 represents an anticipatory control signal calculator which calculates an optimal anticipatory control signal to each coal feeder. Reference numeral 29 represents an adder, which adds the optimal anticipatory control signal 30 calculated by the calculator 28 to the feedback control signal from the (proportioning +integration) calculator 18, and thus constitutes a feedback and anticipatory control system. Reference numeral 69 represents a subtracter which calculates the difference between the coal demand 19 and the operation signal 33a to the motor driver 12. In a coal feeder or feeders operating in the manual control mode, the subtracter 69 calculates the difference between the practical operation signal 33a and the coal demand 19, and applies the result of calculation to the updown counter 20. This makes it possible to prevent the jump of the practical operation signal 33a when the coal feeder or feeders are changed over from the manual control mode to the automatic control mode. This will be described elsewhere in this document.

In the feed-forward calculator 28 of this embodiment, the optimal anticipatory control signal is determined on the basis of the following principle in accordance with the total coal demand 14, the output of the adder 16 (i.e., amount of feedback), the number of automatically operating coal feeders among a plurality of coal feeders, and the bias to each of the coal feeders. First of all, the case where the bias to all coal feeders is zero (FIG. 2; 31), that is, all the points of operation are in the master mode or in the manual mode, will be described with reference to FIG. 3. As shown in the drawing, the total coal feed by m coal feeders which are in the manual mode is given as:

$$\sum_{i=1}^{m} CFH(i)$$

where TCFD is the total coal feed demand, m is the number of the coal feeders which are in the manual mode, CFH(i) is the coal feed for each of the coal feeders which are in the manual mode (with i representing 1 to m), and n is the number of coal feeders in all. Therefore, the coal feed $Y_1$ to be borne by the (n−m) coal feeders which are in the master mode is given by equation (1):

$$Y_1 = TCFD - \sum_{i=1}^{m} CFH(i) \qquad (1)$$

The coal feed quantity $Y_2$ to be borne by each of the coal feeders which are in the master mode is given by equation (2):

$$Y_2 = \frac{TCFC - \sum_{i=1}^{m} CFH(i)}{n - m} \qquad (2)$$

Figure 3:
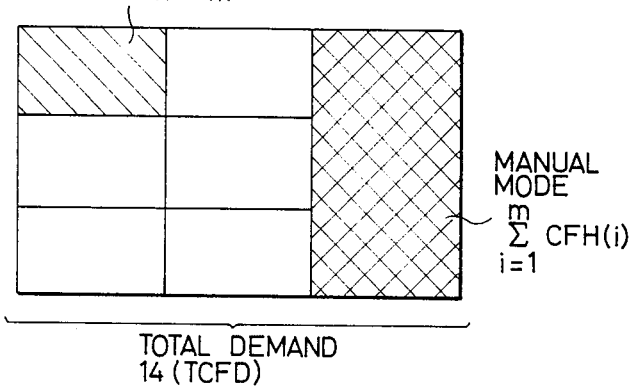
FIG. 3 is a diagram showing the method of determining an anticipatory control signal when including a coal feeder which is in the manual mode operation.
Figure 5:
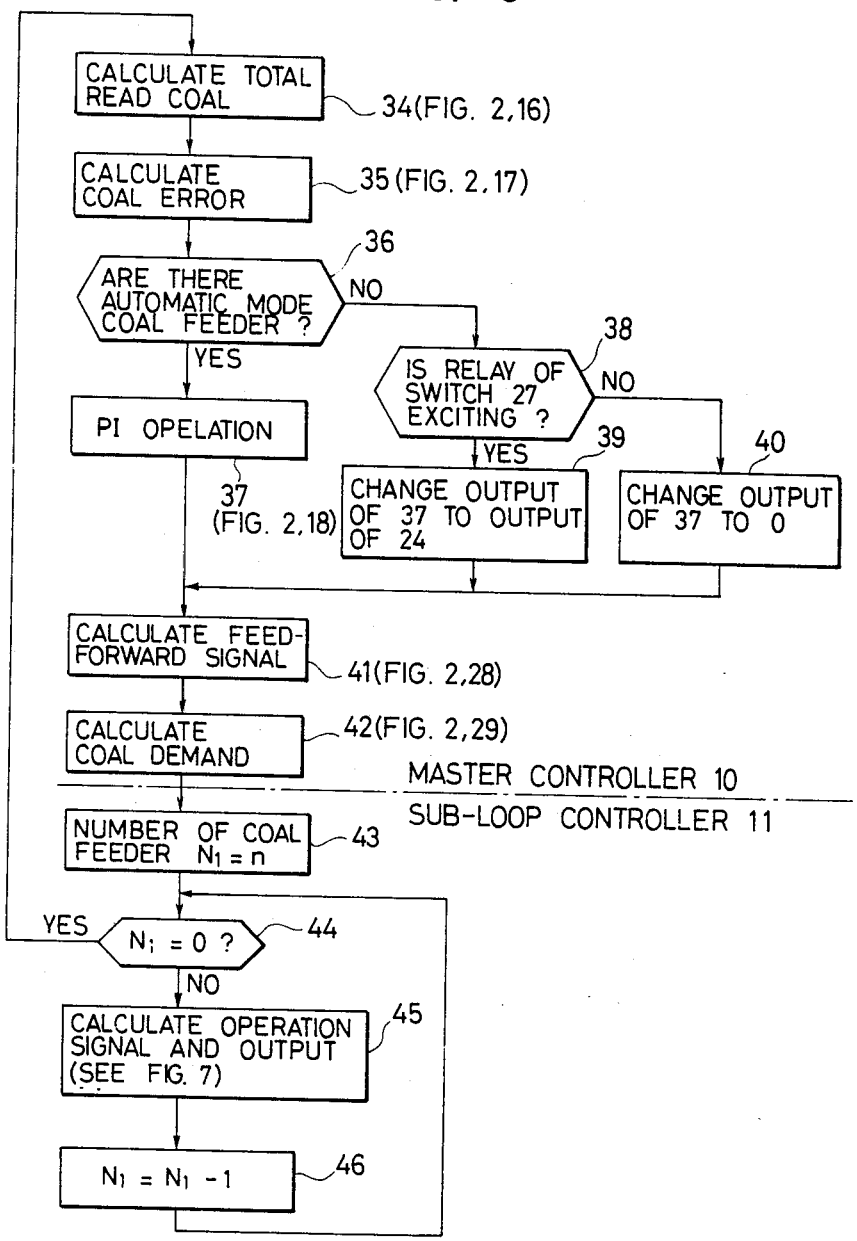
FIG. 5 is a flowchart when the system shown in FIG. 2 is realized using a computer.

$Y_2$ in equation (2) is the feed-forward signal 30 to the coal feeder shown in FIG. 5. FIG. 3 shows the case where (n−m) is 6.

Figure 4:
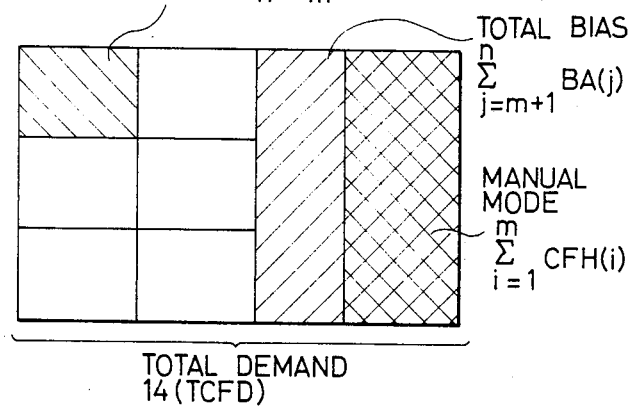
FIG. 4 is a diagram showing the method of determining the anticipatory control signal when including a coal feeder which is in the manual mode operation and a coal feeder which is in the bias mode operation.

Next, the bias to the coal feeder when the output of the counter 20 is not all zero and bias that is applied to at least one coal feeder, will be described with reference to FIG. 4. As can be understood from FIG. 2, the bias of the coal feeder is added to the branched coal demand 19 by the adder 23 for each coal feeder. When the optimal anticipatory signal 30 is calculated, therefore, the sum of each bias value 31 must be reduced from the coal feed $Y_1$ of equation (1). Here, the bias value 31 related to the coal demand 19 naturally relates only to the coal feeder(s) that are in the bias mode. Therefore, assuming that the sum of the biases of each coal feeder in the bias mode is BA(j)—with the proviso that j is (m+1)∼n—$Y_3$ given by equation (3) is the coal feed quantity to be borne by each coal feeder which is in the auto mode, that is, in the master mode and in the bias mode:

$$Y_3 = \frac{TCFD - \sum_{i=1}^{m} CFH(i) - \sum_{j=m+1}^{n} BA(j)}{n - m} \qquad (3)$$

That is, $Y_3$ in equation (3) is the optimal anticipatory signal 30 for the coal feeder when the coal feeder bias is taken into consideration. FIG. 4 shows the case where (n−m) is 6 in the same way as in FIG. 3.

The above is the fundamental principle that makes it possible to apply the feedback and anticipatory control to the fuel control system of a coal fired boiler in accordance with the present invention.

FIG. 5 is a flowchart of the operation when the embodiment shown in FIG. 2 is realized by a computer. In the flowchart, steps up to step 42 correspond to processing inside the master controller, and steps 43 and after correspond to the processing inside the sub-loop controllers 11. Step 41 is shown in detail in the flowchart of FIG. 6, and the step 45, in the flowchart of FIG. 7. In FIG. 5, step 34 corresponds to the adder 16 of FIG. 2, and calculates the sum of the coal feed of the coal feeders in practice to obtain the real coal total. Step 35 corresponds to the comparator 17 in FIG. 2, and calculates the error between the real coal total and the total coal demand.

At step 36, coal feeders that are in the auto mode are identified, and the operation mode of the proportioning integrator of the PI calculator of FIG. 2 is determined. The procedure shifts to step 37 when even a single coal feeder is in the auto mode, whereby the PI calculator, that is, the proportioning integrator 18 of FIG. 2, is set to the auto mode and proportioning integration is effected in accordance with the error obtained by the previous step 35. If judgement at the step 36 is not established (that is, when all the coal feeders are in the manual mode), judgement is made at step 38 as to whether preparation should be made for setting the first coal feeder to the auto mode.

Here, processing at steps 38, 39 and 40 determine the initial value of the PI calculator 18 (FIG. 5, step 37) when the first coal feeder is operated from the state where all coal feeders stop. That is, when the first coal feeder is actuated in FIG. 2, switch 27 is set to manual, and the coal feeder is then raised to the minimum load permitting its continuous operation by the manual operation signal from the up-down counter 24. Then, the switch 27 is changed to auto by exciting a relay not shown. Step 38 of FIG. 5 confirms the excitation of the relay. When the first coal feeder is manually operated for its start, the state does not correspond to the excitation state of step 38. Therefore, the PI output of step 37 is set to 0 at step 40. When the relay is excited—switch 27 is not changed to auto in this state—the output of the PI calculator 27 is made to coincide with the operation signal, the output of the up-down counter 24, for the first coal feeder at step 39. As a result, after changing the position of switch 27, this first coal feeder enters the automatic mode, and in the next processing period, processing shifts from step 36 to step 37 and starts calculation using the value at the previous step 39 as the initial value.

Next, at step 41, the optimal feed-forward signal to the coal feeder is calculated by the feed-forward calculator 28 of FIG. 2. This calculation is executed in accordance with equation (3). This will be explained elsewhere in this document with reference to the flowchart of FIG. 6. At step 42, the coal demand corresponding to the signal 19 of FIG. 2 is calculated. That is, the output 30 of the feed-forward signal calculator 30 is added to the output of the proportioning integrator 18, and the resulting sum is used as the coal demand 19.

At step 43, the number n of the total coal feeders is registered as a set value $N_1$ of a counter (not shown). At step 44, judgement is made as to whether the counter is at 0. That is, judgement is made as to whether the operation signal of the next step, 45, is to be calculated for all the coal feeders. Step 45, which corresponds to sub-loop controller 1 of FIG. 2, calculates the operation signal 33 for each motor driver and outputs the result of this calculation. This component will be described elsewhere in this document with reference to the flowchart of FIG. 8. Step 46 is that of decrementing the counter; the count is reduced by one as the calculation of the operation signal for each motor driver is completed. Therefore, when calculation of the operation signals for n motor drivers is completed, judgement at the step 44 is established, whereby processing returns to the start.

Figure 6:
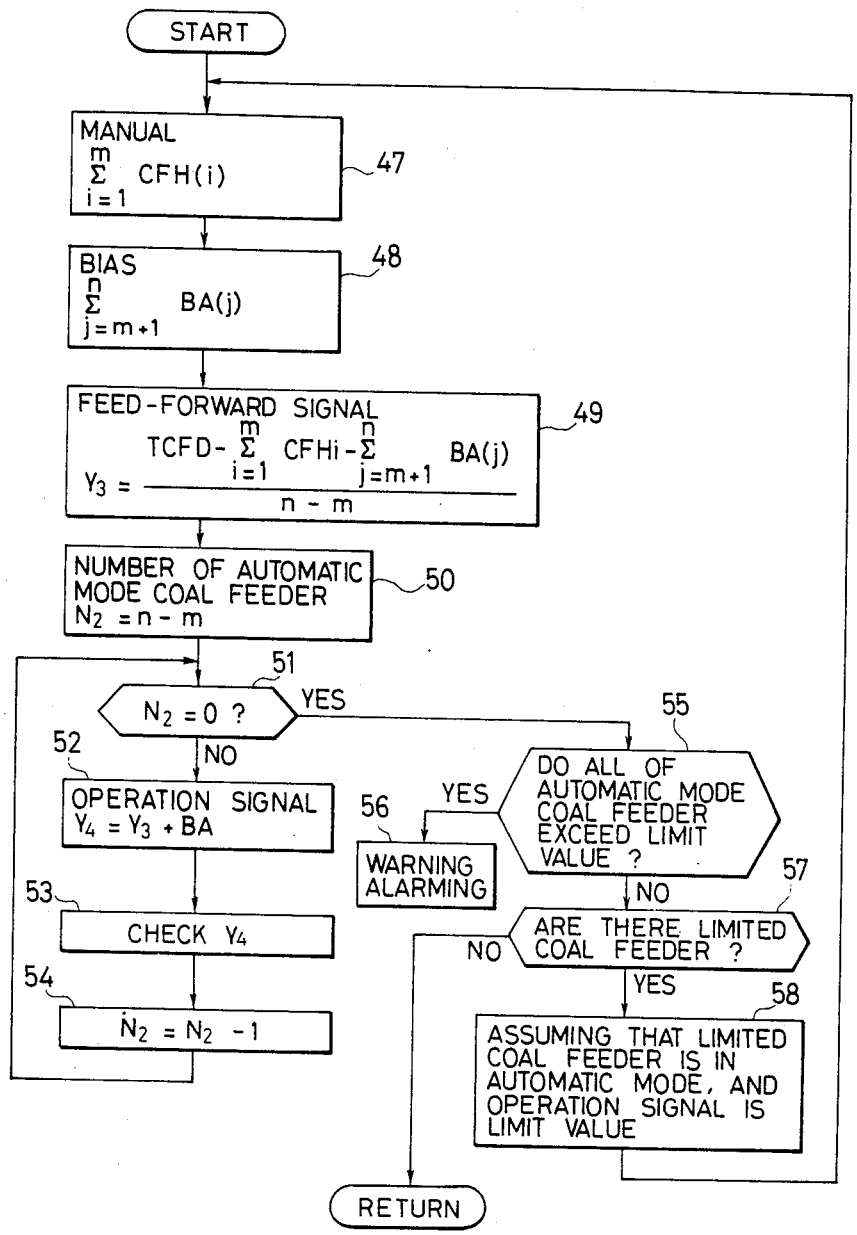
FIG. 6 is a flowchart showing in detail an anticipatory control signal determination step 41 in the flowchart shown in FIG. 5.

FIG. 6 is a detailed flowchart of the calculation of the optimal anticipatory control signal to the coal feeder shown at step 41 of FIG. 5. At step 47, the total $$\sum_{i=1}^{m} CFH(i)$$

of the coal feed quantities of the coal feeders in the manual mode is calculated. At step 48, the total $$\sum_{j=m+1}^{n} BA(j)$$

of the bias quantities applied to the coal feeders in the auto mode is calculated. At step 49, the optimal anticipatory control signal for each coal feeder is calculated in accordance with equation (3) given earlier.

At step 50, the set value of the counter is $N_2$ and the number (n−m) of the coal feeders in the auto mode is registered. At step 51, final judgement as to whether the counter is 0, that is, the check of upper and lower limits of the coal demand for the coal feeders in the auto mode (steps 52 and 53 which will be described later in this document), is made. Here, steps 52, 53 and 54 are directed to calculate the operation signal (FIG. 2; 33) for all the coal feeders in the automatic mode and to judge whether or not this operation signal deviates from the allowable upper and lower limit values for safe operation of the coal feeders. In other words, step 52 adds the bias signal BA(j) of the coal feeders in the automatic mode to the optimal anticipatory signal $Y_3$ obtained at step 49, and calculates the operation signal $Y_4$ (FIG. 2; 33). Step 53 judges whether the result of calculation $Y_4$ at step 52 exceeds the upper or lower limit value of the coal feeders. Step 54 is the count-down processing of the counter. Whenever the check of the upper and lower limit values for one coal feeder is completed, the value $N_2$ in the counter is decremented by one, and the procedure returns to the judgement processing of step 51. At step 51, when $N_2=0$ and it has been determined that the upper and lower limit values for all the coal feeders that are in the automatic mode have been checked, processing proceeds to step 55.

At step 55, judgement is made as to whether the check of the upper and lower limits at step 53 has been made for all coal feeders that are in the automatic mode. If it provides to be YES, suitable coal feed control is impossible and the start or stop of the coal feeder(s) becomes necessary. Therefore, an alarm is transmitted to the operator at step 56. At step 57, check is made as to whether or not even a single coal feeder has reached the limit at step 53. If even one coal feeder is found to have reached the limit, the anticipatory signal to the coal feeders calculated at the previous step 49 is not an optimal value, so that processing at step 58 which will be described elsewhere is executed, and calculation is made again. Conversely, if none of the coal feeders have reached the limit, the value $Y_3$ obtained at the preceding step 49 proves to be optimal value so that the calculation of the optimal feed-forward value is completed. At step 58, the coal feeders which are found to have reached the limit are regarded as being in the manual mode, even though they are in the automatic mode, to again calculate the optimal value, and their operation signal 33 is replaced by the limit value. Thereafter, the procedure returns to step 47. Each of the following steps is then executed once again, and the same procedures are repeated until the judgement at step 57 is NO.

FIG. 7 is a flowchart of the coal demand calculation to the motor driver represented by reference numeral 45 in FIG. 5, and its output. This processing is executed for the individual coal feeders. Step 59 in FIG. 7 is the mode judgement of the coal feeders. If the coal feeders are in the automatic mode, the procedure shifts to step 60, where the up-down counter 20 of FIG. 5 is set to the manual setting mode. In this mode, the output of the up-down counter 20 can be increased or decreased by the manual up-down signal 21 or 22. If these signals 21 and 22 are not operated, the counter 20 holds the existing output. Step 61 corresponds to the adder 23 of FIG. 5. At this step, the manual setting up-down counter 24 of FIG. 5 is set to the follow setting mode. That is, the output 32 of the up-down counter 24 is made to coincide with the operation signal 33 so that the control operation does not change abruptly when the switch 27 is changed from manual to automatic. At step 63, the switch 27 of FIG. 5 is changed so as to select the output of the adder 23.

When the judgement at step 59 is the manual mode, the procedure proceeds to step 64, where the counter 20 of FIG. 5 is set to the follow setting mode and its output is made to coincide with the output of the subtracter 69. According to this arrangement, the operation does not change abruptly when the switch 27 is changed over during mode switching. At step 65, the coal demand 19 and the bias 31 are added. This corresponds to the adder 23 of FIG. 5. At step 66, the up-down counter 24 of FIG. 5 is set to the manual mode so that its output can be increased or decreased by the manual operation signals 25 and 26. At step 67, switch 27 of FIG. 5 selects the output of the counter 24. At step 68, the operation signal 33 for the motor driver in the automatic or manual mode, which signal is obtained at step 63 or 67, is applied to the corresponding motor driver 12.

The present invention can be modified and practised in the following way.

(1) In the afore-mentioned equation (2) and (3), the load is equally distributed among the coal feeders that are operating in the automatic mode. However, the load sharing ratio may be changed by determining in advance a correction gain for each coal feeder. (2) The coal demand 19 may be obtained by the feedforward signal alone that is calculated by equation (2) or (3), by omitting the comparator 17 and the PI calculator 18.

As described earlier, the present invention can be applied also to a pump control system for controlling the total feed water quantity by a plurality of pumps or to a master system for load sharing control when a predetermined load is borne by a plurality of gas turbines, besides the control of coal feeders described above.

In accordance with the present invention described so far, a (feedback +anticipatory control) system can be applied to a fuel control system for coal fired boilers such as shown in FIG. 5, so that it becomes possible to let the coal feeders, which are in the automatic mode, always share the load optimally and such load distribution will be accomplished quickly.

As a result, the present invention can eliminate the operation delay of fuel control systems as a limitation on the unit load follow-up performance, and can improve the load following performance of the unit.

Since the present invention can calculate the optimal anticipatory signal for coal feeders as shown in FIG. 6, the present invention provides also the following effects.

(1) The load instruction can be given to each coal feeder by the optimal anticipatory control signal with respect to the total coal quantity change without regard to the error of the total coal feed quantity.

(2) Optimal load sharing can be achieved for the rest of coal feeders during the bias operation for starting the waiting coal feeder(s) or for stopping the coal feeder(s) to which coal has been excessively supplied, so as to maintain a relatively stable total coal feed.

As shown in FIG. 6, the upper and lower limits of the coal demand to the coal feeders are checked, and if any coal feeders have reached the limit, the coal feed instruction is recalculated made so as to quickly and accurately obtain the optimal value.

If all the coal feeders have reached the limit, an alarm is transmitted to the operator so that the starting and stopping operation of the coal feeders can be regulated.

When the present invention is applied to the load sharing control of a plurality of gas turbines and to the feed water control of a boiler in a thermal power plant, exactly the same result can be obtained, as those skilled in the art could easily comprehend.

What is claimed is:

1. An automatic anticipatory control system for controlling a plurality of points of operation which can be individually and arbitrarily changed between start and stop operations and between an automatic operation mode and a manual operation mode, by means of a common control quantity, said system comprising:
first means for obtaining the sum of load quantities borne by said points of operation that are operating in said manual operation mode;
second means for obtaining the sum of load quantities to be borne by said points of operation that are operating in said automatic operation mode, on the basis of the sum of the load quantities obtained by said first means and said common control quantity;
third means for obtaining control signals for said points of operation that are operating in said automatic operation mode, on the basis of the sum of the load quantities obtained by said second means and on the basis of the number of said points of operation that are operating in said automatic operation mode;
a plurality of sub-loop controllers, each disposed for each of said points of operation and generating a driving control instruction for each of said points of operation on the basis of said control signal; and
a plurality of driving means for practically driving the corresponding points of operation on the basis of said driving control instruction of each of said sub-loop controllers.

2. An automatic anticipatory control system according to claim 1 wherein said third means obtains a control signal for each of said points of operation that are operating in said automatic operation mode, on the basis of the number of said points of operation that are operating in said automatic operation mode and on the basis of their respective correction gains.

3. An automatic anticipatory control system for controlling a plurality of points of operation which can be individually and arbitrarily changed over between start and stop operations and between an automatic operation mode and a manual operation mode, by means of a common control quantity, said system comprising:
first means for obtaining the sum of the loads borne by said points of operation that are operating in said manual operation mode;
bias quantity calculation means for determining the sum of biases of said points of operation that are operating in said automatic operation mode;
second means for obtaining the sum of the loads to be borne by said operation ends that are operating in said automatic operation mode, on the basis of the sum of the loads obtained by said first means, the output of said bias calculation means and said common control quantity;
third means for obtaining a control signal for each of said points of operation that are operating in said automatic operation mode, on the basis of the sum of the loads obtained by said second means, the output of said bias calculation means and the number of said points of operation that are operating in said automatic operation mode;
a plurality of sub-loop controllers, each disposed for each of said points of operation and generating a driving control instruction for each of said points of operation on the basis of said control signal; and
driving means for practically driving the corresponding points of operation on the basis of the driving control instruction of each of said sub-loop controllers.

4. An automatic anticipatory control system according to claim 3 wherein said third means obtains said control signal for each of said points of operation that are operating in said automatic operation mode, on the basis of the number of said points of operation that are operating in said automatic operation mode, and on the basis of their respective correction gains.

5. An automatic anticipatory control system for controlling a plurality of points of operation which can be individually and arbitrarily changed over between start and stop operations and between an automatic operation mode and a manual operation mode, by means of a common control quantity, said system comprising:
first means for obtaining the sum of the loads borne by said points of operation that are operating in said manual operation mode;
seocnd means for obtaining the sum of the loads to be borne by said points of operation that are operating in said automatic operation mode, on the basis of the sum of the loads obtained by said first means and said common control quantity;
third means for obtaining a feed-forward control signal for each of said points of operation that are operating in said automatic operation mode, on the basis of the sum of the loads obtained by said second means and the number of said points of operation that are operating in said automatic operation mode;
an adder for obtaining the sum of the loads of all of said points of operation;

means for obtaining the error of the sum of the loads of all of said points of operation with respect to said common control quantity;

means for producing a control signal for each of said points of operation on the basis of said error and said feed-forward control signal;

a plurality of sub-loop controllers, each disposed for each of said points of operation and generating a driving control instruction for each of said points of operation; and driving means for practically driving the corresponding points of operation on the basis of the driving control instruction of each of said sub-loop controllers.

6. An automatic anticipatory control system according to claim 5 wherein said third means obtains a control signal for each of said points of operation that are operating in said automatic operation mode, on the basis of the number of said points of operation that are operating in said automatic operation end, and their respective correction gains.

7. An automatic anticipatory control system for controlling a plurality of points of operation which can be individually and arbitrarily changed over between start and stop operations and between an automatic operation mode and a manual operation mode, by means of a common control quantity, said system comprising:

first means for obtaining the sum of the loads borne by said points of operation that are operating in said manual operation mode;

bias quantity calculation means for obtaining the sum of the biases of said points of operation that are operating in said automatic operation mode;

second means for obtaining the sum of the loads to be borne by said points operation that are operating in said automatic operation mode, on the basis of the sum of the loads obtained by said first means, the output of said bias quantity calculation means and said common control quantity;

third means for obtaining an anticipatory control signal for each of said points of operation that are operating in said automatic operation mode, on the basis of the sum of the loads obtained by said second means, the output of said bias calculation that are operating in said automatic operation mode;

an adder for obtaining the sum of the loads of all of said points of operation;

means for obtaining the error of the sum of the loads of all of said points of operation with respect to said common control quantity;

means for producing a control signal for each of said points of operation on the basis of said error and said feed-forward control signal;

a plurality of sub-loop controllers, each disposed for each of said points of operation and generating a driving control instruction for each of said points of operation; and driving means for practically driving the corresponding points of operation on the basis of the driving control instruction of each of said sub-loop controllers.

8. An automatic anticipatory control system according to claim 7 wherein said third means obtains a control signal for each of said points of operation that are operating in said automatic operation mode, on the basis of the number of said points of operation that are operating in said automatic operation mode, and their respective correction gains.

* * * * *